Patented Sept. 2, 1952

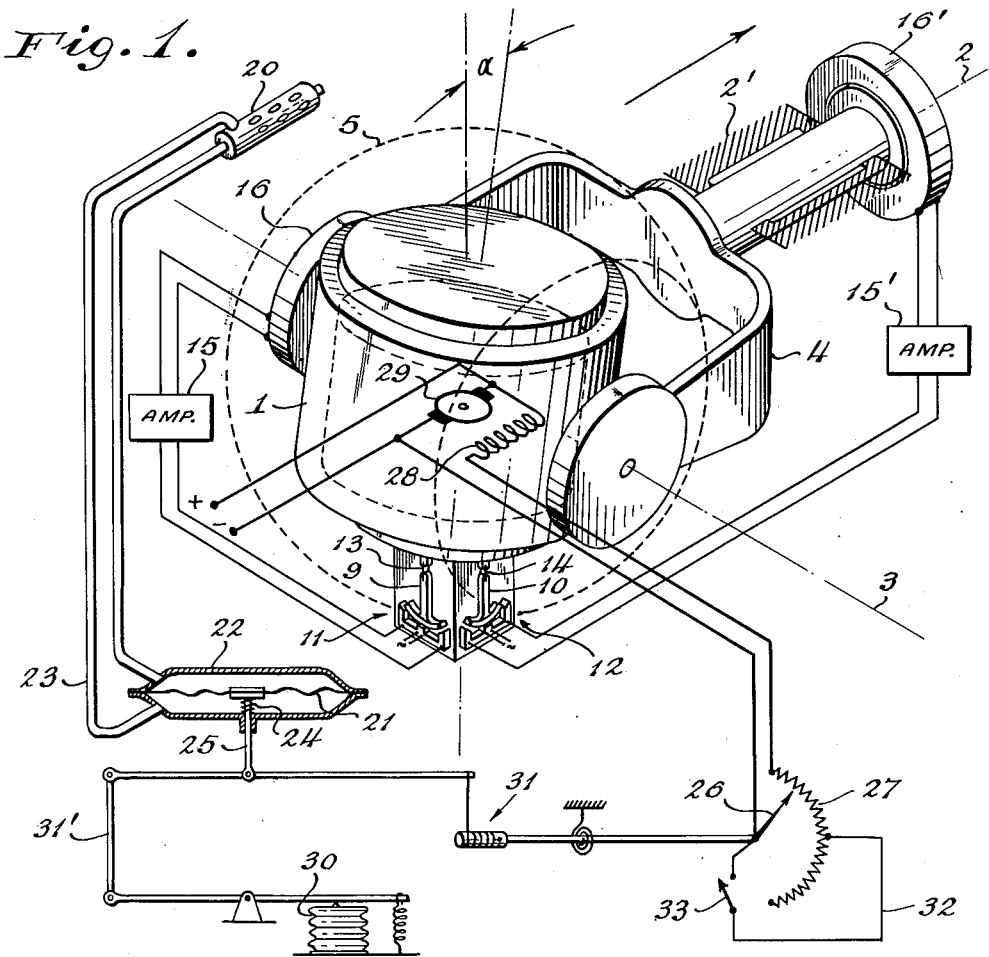

2,608,869

UNITED STATES PATENT OFFICE 2,608,869

INCLINED GYRO VERTICAL

Herbert H. Thompson, Manhasset, N. Y., assignor to The Sperry Corporation, a corporation of Delaware Application September 26, 1946, Serial No. 699,572
In Great Britain March 13, 1946

6 Claims. (Cl. 74—5.47)

This invention relates to gyro-verticals or gyroscopic artificial horizons designed for use on moving craft such as ships or aircraft. As described in the prior patent of Frederick D. Braddon, reissued as No. 23, 291 for Gyro-Verticals, originally filed April 16, 1941, and in the joint application of Frederick D. Braddon and Walter Wrigley, Serial No. 566,568 for Inclined Gyroscopic Horizons, filed December 4, 1944, it is now known that turn errors in the ordinary gyro-vertical which is erected by a torque applied about a horizontal axis at right angles to the relative tilt of the gyroscope and gravitational controller may be largely mitigated by forwardly inclining the gyroscope at a correct angle. Such a correction, however, as heretofore proposed was only partial. If the aforesaid gravitational erection device applies a torque which is substantially constant, regardless of rate of turn or speed of the craft, such correction is only exactly correct for a predetermined rate of turn of the craft as particularly pointed out in the aforesaid Braddon sole application. If, however, the gravitational erection device applies a torque which is substantially proportional to the lateral acceleration force due to turns or, in other words, proportional to the tangent of the relative tilt angle of the gyro and a free pendulum (which is the bank angle of the craft) such correction is only complete if, when the turn takes place, the airplane is flying at the predetermined air speed for which the instrument is designed.

Also, in the aforesaid solutions, while the error due to turn is substantially cured under certain predetermined conditions and greatly mitigated under conditions which vary therefrom in the particulars pointed out above; no correction is secured in these prior devices for changes in speed of the craft. In other words, upon change of speed of the craft, the gravitational responsive controllers cause a temporary deviation of the gyro-vertical, which shows up usually after the aircraft has arrived at its new speed, and persists until corrected by the erection device.

My invention is mainly concerned with the type of erection device which gives a torque proportional to the lateral acceleration force. By my invention, I not only furnish a complete cure for turn errors at all ordinary air speeds and rates of turn, but also prevent the occurrence of errors due to change of linear speed of the craft and I accomplish both of these results by one and the same means and in one and the same operation.

According to my invention, I so design my inclined gyro-vertical and so arrange the various factors thereof, namely, the angle of inclination ($a$), the erection torque gradient ($K$), that is, the ratio of the erecting torque to inclination, the moment of inertia of the rotor ($M$) and the rotor speed ($\omega$), that no turn error is apparent regardless of the rate of turn when the craft is flying at its normal or cruising speed. As explained above, this involves the use of a proportional torque applying device instead of the "on-off" type device first described above, since in the former the amount of the error due to turns is substantially unaffected by the rate of turn and only affected by linear speed during the turn.

According to my invention, I propose to employ a single gyro rotor with a forward inclination $a$, and to vary the rotor speed ($\omega$) thereof with changes of speed of the craft leaving the angle of inclination constant. By this means a proper rate of precession of the inclined axis is in azimuth maintained for all air speeds since, while a change of air speed does change the lateral acceleration force acting on the bank pendulums during a turn, this is compensated for by the fact that the rotor speed is also changed proportionally to air speed so that the angle of inclination may remain constant.

It may also be shown mathematically and experimentally that the change of speed error due to the effect of acceleration on the pitch pendulums is also cured by changing the rotor speed simultaneously with and proportional to the change of speed. In other words, the reaction on the gyroscope having a component about the fore-and-aft axis in accelerating or decelerating the rotor, applies a torque sufficient to oppose and prevent an oscillation being set up by the pitch erection device due to the action of the acceleration forces thereon at the time.

To restate the foregoing mathematically—

(1) The basic law governing the removal of the turn error in this type of gyro-vertical may be simply stated as follows:

$$\alpha = \frac{KS}{Mg\omega}$$

where a = the angle of inclination of the gyro,
K = the erecting torque gradient, that is, the ratio of the erecting torque to inclination,
S = the speed of the craft,
ω = the rotor speed,
M = its moment of inertia, and
g = the acceleration of gravity.

While the foregoing shows that for curing the turn of error, (ω) may be varied directly with S or (a) may be varied directly with S, or (K) may be varied inversely with S, I propose to vary (ω) with S both because of simplicity in structure and because it also cures the errors due to the linear acceleration force during the change of speed of the craft as stated above.

The manner in which the effect of linear acceleration on the pendulums (i. e., acceleration due to speed changes) is compensated will be apparent from the following analysis. Assuming an increase in speed causing such an acceleration $(dS/dt)$, the pitch pendulum which controls the torquer leans backwards and causes a torque to be applied to the gyroscope in a direction to cause it to follow the tilt of the pendulum. Since the erection signal is proportional to $(dS/dt)/g$, it is required that the horizontal component (sine a) of the gyro momentum furnish an equal and opposite torque. The following expression therefore gives the conditions that need be met in order to compensate for straight line accelerations in the direction of flight, $$\frac{dS}{dt}(M\omega \sin \alpha) = \frac{dS}{dt} \times \frac{1}{g}$$

By integration, $$M\omega \sin \alpha = K\frac{S}{g} + a \text{ constant}$$

(The constant is zero in the apparatus shown.)

The gyro constants are chosen so that the angle is always small so that the foregoing expression reduces itself to the following since the sine of the small angle is approximately equal to that angle, $$M\omega\alpha = K\frac{S}{g} \text{ or } \alpha = \frac{KS}{M\omega g}$$

The roll erection torque developed in a turn, assuming that the erector is proportional as described, is proportional to the centrifugal acceleration $a = \phi S$ where $\phi$ is rate of turn about a vertical axis. The condition to be met is $$(M\omega \sin \alpha)\phi = K\frac{\phi S}{g}$$

or, a being small, $$\alpha = \frac{KS}{M\omega g}$$

This expression is identical with that for compensation of longitudinal accelerations and shows therefore that if ω is varied proportionally with S, the errors due to acceleration of the craft, whether the acceleration be due to turns or changes of speed or both, are fully compensated.

Referring to the drawings, several forms of my invention are disclosed as follows:

Fig. 1 is a diagrammatic perspective view of my improved inclined gyro-vertical; and Fig. 2 is a side elevation, partly in section, showing my invention as applied to a similar gyro having somewhat a different type of erection device.

The gyroscopic structure in all figures is shown as enclosed in a casing 1 mounted for freedom on the craft about a fore-and-aft trunnion axis 2 and a lateral gimbal axis 3. While the gyroscopic structure usually preferably comprises but a single gyroscope with its spin axis at a small angle (a) to the vertical; such structure may, of course, comprise a plurality of gyroscopes as both types of gyro-verticals are well known. (See Patent No. 1,236,993 to Sperry and Tanner.) The gimbal ring 4 is journalled in a long bearing 2' on said fore-and-aft axis and is open at the front or U-shaped to furnish an unobstructed view of the indicating portion of the instrument, which may be in the form of a spherical shell 5 (see also Fig. 2) enclosing the gyro casing on which suitable pitch and roll indicating lines 7 and 8 are placed. The gravitational control is shown as furnished by a pair of pendulums 9 and 10 pivoted respectively about fore-and-aft and transverse horizontal axes, each pendulum controlling a signal means responsive to relative inclination of the pendulum and gyroscope about its pivotal axis. Electrical pick-off or signal generating means 11, 12 is shown in this figure for each pendulum. Instead of freely pivoting the pendulums as is usually done, I prefer to pivotally connect them to the gyro casing by short fairly stiff leaf springs 13, 14, so as to greatly restrain their outward movement during a change of speed or during turns and to cause such movement to be substantially proportional to the amount of such lateral acceleration force, which is proportional to the tangent of the angle of tilt between the gyro and the affected pendulum. Such a suspension causes the pendulums to act more as accelerometers than pendulums, although still responsive to gravity, since in this structure, the displacement of the pendulums from normal remains substantially proportional to the banking angle even during high rates of turn at high speed, since the springs are made stiff enough to prevent the pendulums from swinging beyond the control range of the signal transformer pick-offs 11, 12 provided in connection therewith. The windings on said pick-offs are omitted in the drawings for simplicity.

Each of these pick-offs is shown as of the "E" or three-legged type mounted directly under each pendulum and giving an A. C. output proportional to the amount of relative displacement of the pendulum and the gyroscope from norm, and reversible in phase with the direction of displacement. The output of the transformer 11, after passing through phase-sensitive amplifier 15, is applied to a suitable torque applying motor 16, acting about the transverse axis 3 to apply a torque on the gyroscope at right angles of the tilt and proportional to the lateral acceleration force. Similarly, the transformer 12 under the spring-restrained pendulum 10 applies through amplifier 15' a proportional torque about the fore-and-aft axis to the gyroscope through the torquer 16'.

The tilt angle (a) is maintained in Fig. 1 by connecting the pendulum structure to the gyro at an angle, so that when the fore-and-aft swinging pendulum 10 is hanging vertically, the vertical axis of the gyro unit is inclined forwardly at the predetermined angle (a). It is obvious that the same result may be secured by mounting the pendulum structures symmetrically on the gyro and by biasing the pendulum to hang at the required inclination, as shown in Fig. 1 of the aforesaid Braddon patent or as shown in Fig. 2 hereof.

For furnishing a measure of the speed of the craft, there is shown diagrammatically a Pitot tube arrangement 20 having the open end thereof facing forward on a craft and connected to one side of a pressure-responsive diaphragm 21, separating sealed casing 22 into two parts. The other part of said casing on the other side of the diaphragm is shown as supplied with static pressure from the tube 23. Preferably, a spring 24 is provided within the container around shaft 25 to hold the diaphragm in a midposition while the aircraft is flying at normal or cruising speed. While the movements of the diaphragm 21 may be transmitted directly from shaft 25 to a rotor speed governing device, I prefer to interpose a correction device which corrects the indicated air speed which would be given by the output or movements of the shaft 25, so that a movement is obtained which is indicative of true air speed, since the rotor speed should be corrected for true air speed rather than an indicated air speed.

The drawings are intended to represent diagrammatically one form of known true air speed meter such as is more fully described in the patent to Spencer Kellogg, 2nd, No. 2,496,294, dated February 7, 1950 for Speed Governing System for Dirigible Craft. For this purpose shaft 25 is shown as governing the position of a slider 26 on resistance or potentiometer 27 which is in series with a shunt field 28 of the motor 29 which spins the gyro rotor, but the position of slider 26 is also corrected by sealed bellows 30, connected into the linkage 31 connecting shaft 25 and arm 26. Link 31' of this linkage is also made temperature sensitive, so that temperature and air density changes are compensated for. When the aircraft is going at a maximum speed, the slider introduces the maximum resistance 27 into the field circuit so that the rotor at that time is driven at its maximum speed. For lesser speeds, the resistance is cut-out until the field strength is a maximum and the motor is driven at its minimum speed, which is usually taken to be about the stall speed of the craft. Hence, the main starting switch of the motor 29 may be closed while the aircraft is still on the ground so that the rotor will be brought up to this minimum speed.

Preferably, however, I provide a bridge circuit 32 around the potentiometer arm 26 which circuit may be closed by operating a switch 33. This circuit is connected to a midpoint on a potentiometer so that when the switch is closed, the rotor is spun at a speed which preferably corresponds to the average or cruising speed of the craft. Preferably, the instrument is so designed that the forward inclination $a$ is such that the turn error is completely cured when the airplane is flying at cruising speed, with the speed of the rotor about midway between its maximum and minimum speeds. Therefore, the switch 33 may be used to advantage in testing instruments under average flight conditions.

In Fig. 2, I have shown my invention as applied to a gyroscope having a slightly different form of erection device but which gives a torque proportional to tilt through a substantial angle although through a lesser angle than in Fig. 1. This erection device is of the eddy current type and is shown and described more particularly in the prior patent to Frische and Esval, No. 2,229,645, dated January 28, 1941 for Electro-Magnetic Erection Devices for Gyroscopes. According to this form of my invention, the spherical housing 5 enclosing the gyroscope and on which the horizon markings 7 and 8 are placed, may also act as the conductor in which eddy currents are induced by the three-phase circular stator 34 having a plurality of poles and independently mounted as a pendulum beneath the gyroscope.

For this purpose, the stator 34 is shown as supported by an arm 35 pivoted on transverse axis 36 normally in line with the transverse axis 3' of the gyroscope, the stator normally hanging at the desired angle $a$ to the vertical. A separate gimbal ring 37 is provided on which the member 36 is so pivoted, said ring 37 being journalled in the instrument by means of a long sleeve 38 and suitable bearings 39. The gimbal ring 4 is in turn journalled in sleeve 38 by bearings 40 and in this form sleeve 38 constitutes the main longitudinal bearing for the gimbal ring 4. The variation of the rotor speed may be accomplished in the same manner shown in Fig. 1 from a true air speed meter (not shown).

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. A gyro-vertical for dirigible craft in which the gyro unit is forwardly inclined for eliminating turn errors, means responsive to the air speed of the craft, and means for varying the rotor speed thereof proportionally to variations in the response of said first means with air speed changes.

2. A forwardly inclined gyro vertical as claimed in claim 1 in which said air speed responsive means is compensated for temperature changes so as to be responsive to true air speed.

3. A gyro-vertical for dirigible craft having a gravitationally controlled power erection device of the proportional type so constructed and arranged as to cause the gyro to remain forwardly inclined at a constant angle to reduce turn errors, means responsive to the air speed of the craft, and means for varying the rotor speed with changes of said speed responsive to said first means to eliminate all acceleration errors whether linear or centrifugal.

4. A gyro-vertical for dirigible craft in which the gyro unit is forwardly inclined for eliminating turn errors, means for spinning the rotor, means for progressively varying the speed at which said rotor is driven, a true air speed measuring device, and means for operating said speed varying means from said device, whereby all acceleration errors are substantially eliminated.

5. A gyro-vertical for dirigible craft in which the gyroscope is forwardly inclined about one of its gimbal axes for eliminating turn errors, a gravitational controller acting about each of its gimbal axes having an output proportional to acceleration forces having a horizontal component affecting the respective controllers, a torque applying device about each of said axes of the gyroscope controlled respectively by one of said controllers and means for varying the speed of the rotor of said gyroscope proportional to the speed of the craft.

6. In a gyro-vertical for dirigible craft of the single gyro type in which the spin axis of the gyro is forwardly inclined for reducing turn errors, spinning means for the rotor of said gyro, means for selectively varying the speed at which said rotor is spun, an air speed measuring device, and means for operating said speed varying means from said device to maintain a rotor speed proportional to air speed, whereby both turn and acceleration errors are reduced.

HERBERT H. THOMPSON.

REFERENCES CITED

The following references are of record in the file of this patent:

UNITED STATES PATENTS

| Number | Name | Date |
|---|---|---|
| 1,442,799 | Gray | Jan. 23, 1923 |
| 1,628,136 | Ford | May 10, 1927 |
| 1,932,210 | Glitscher | Oct. 24, 1933 |
| 1,986,807 | Gillmor | Jan. 8, 1935 |
| 2,366,543 | Meredith | Jan. 2, 1945 |
| 2,409,659 | Braddon | Oct. 22, 1946 |
| 2,412,614 | Haskins, Jr. et al. | Dec. 17, 1946 |
| 2,474,549 | Schoeppel | June 28, 1949 |